United States Patent [19]

Sohier

[11] 4,318,717

[45] Mar. 9, 1982

[54] METHOD FOR THE TREATMENT OF AN IMPURE GAS STREAM AND APPARATUS THEREFOR

[75] Inventor: Bernard Sohier, Rouen, France

[73] Assignee: Rhone-Poulenc Industries, Paris, France

[21] Appl. No.: 143,043

[22] Filed: Apr. 23, 1980

[30] Foreign Application Priority Data

Apr. 23, 1979 [FR] France ............................... 79 22082

[51] Int. Cl.³ ..................... B01D 47/06; B01D 47/12; C11B 7/20
[52] U.S. Cl. .......................................... 55/71; 55/89; 55/94; 55/226; 55/257 R; 261/116; 422/172; 422/225; 423/241
[58] Field of Search ................. 55/71, 89, 90, 94, 226, 55/257 R, 224, 225; 261/78 A, 116, DIG. 54, DIG. 56, 111, DIG. 9; 422/172, 225; 423/241, 320

[56] References Cited

U.S. PATENT DOCUMENTS

| 757,757 | 4/1904 | Luhne | 261/116 |
|---|---|---|---|
| 970,654 | 9/1910 | Sepolchre | 55/90 |
| 3,113,168 | 12/1963 | Kinney | 261/116 |
| 3,166,348 | 12/1963 | Walker | 261/DIG. 54 |
| 3,339,344 | 12/1967 | Pallinger | 55/90 |
| 3,385,030 | 5/1968 | Letvin | 55/90 |
| 3,427,006 | 2/1969 | Oiestad | 261/DIG. 54 |
| 3,456,928 | 7/1969 | Selway | 55/257 R |
| 3,552,727 | 1/1971 | Ortgies | 55/257 R |

FOREIGN PATENT DOCUMENTS

| 1667694 | 4/1971 | Fed. Rep. of Germany | 423/241 |
|---|---|---|---|
| 565906 | 2/1924 | France | 55/90 |
| 1206642 | 9/1970 | United Kingdom . | |
| 347069 | 11/1972 | U.S.S.R. | 55/71 |

Primary Examiner—David L. Lacey
Attorney, Agent, or Firm—Burns, Doane, Swecker & Mathis

[57] ABSTRACT

Impure gas streams are purified/treated in a gas-liquid phase contactor of cocurrent spray scrubber type, wherein the feed gas, together with a cocurrently descending spray of treatment liquid, are introduced into a contact zone under conditions such that the pressure of atomization of the liquid and the liquid dispersing velocity of the gas feed ensure effective interphase surface and contact time therefor, whereby the impure gas is efficiently physically scrubbed by said liquid, either with or without concomitant chemical reaction therebetween, and the dispersed liquid interphase is then vertically directed to a downstream separation zone wherein the gas stream is subjected to an abrupt change in direction and is thus separated from the interphase at essentially the original inlet velocity thereof and with essentially no content of treatment liquid, while at the same time essentially all of the atomized treatment liquid maintains its vertically downward descent to a liquid collection and recovery zone. Advantageously, the contact zone inlet comprises a constriction adapted to ensure the effective interphase surface and contact time therefor.

24 Claims, 5 Drawing Figures

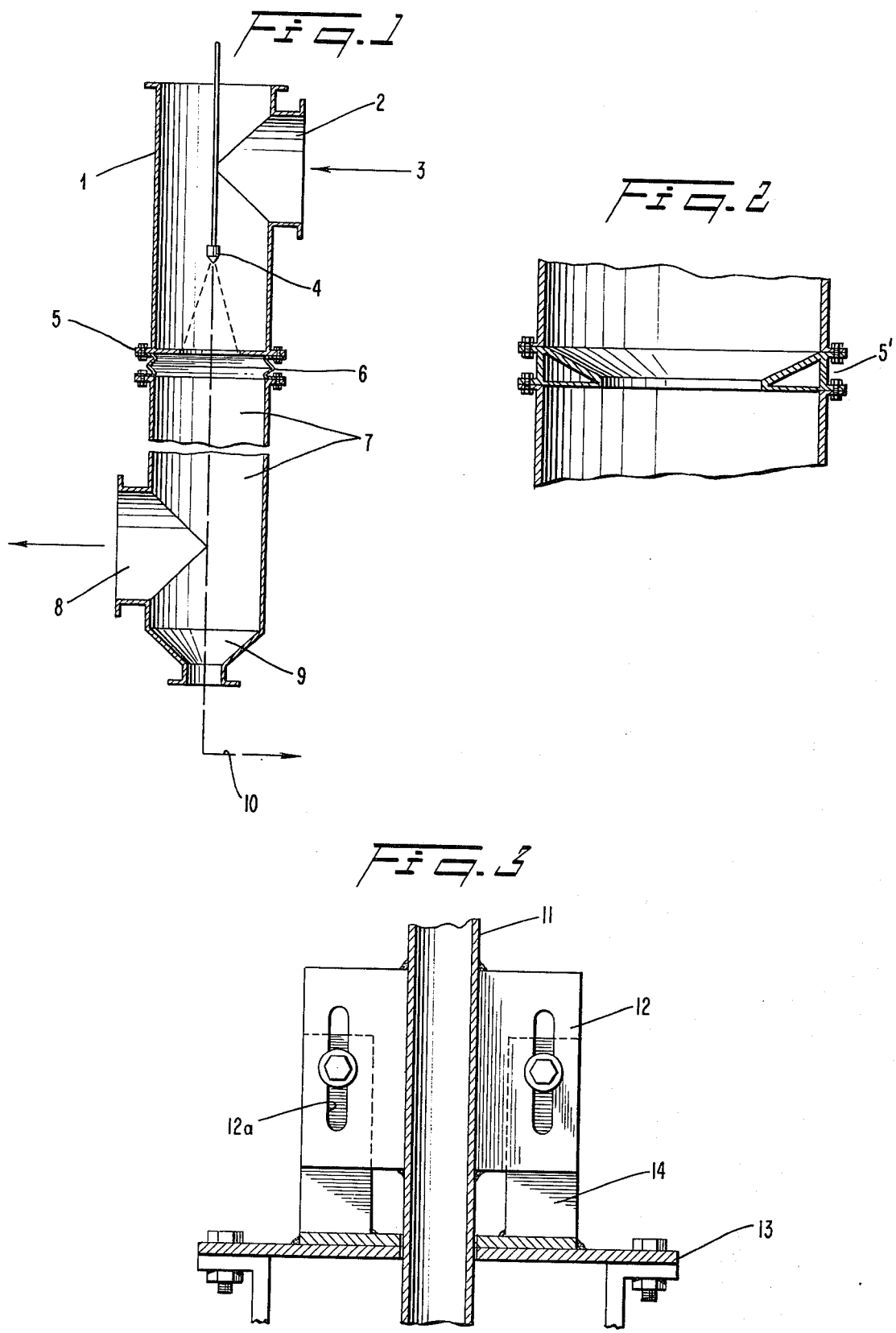

METHOD FOR THE TREATMENT OF AN IMPURE GAS STREAM AND APPARATUS THEREFOR

BACKGROUND OF THE INVENTION

1. Field of the Invention

The present invention relates to gas-liquid contacting, and, more especially, to the physical and/or chemical spray scrubbing of a gas stream in a cocurrent gas-liquid phase contactor therefor.

2. Description of the Prior Art

It is ofttimes required and/or necessary to purify or otherwise treat effluent gas streams, especially if same are destined for venting into the atmosphere. Such purification/treatment is typically deemed the "sanitation" thereof, and usually is carried out in any one of a great number of known gas-liquid phase contactors, the operation of each of which must be strictly optimized in order to effect true or acceptable purification of such gas streams.

And optimization may be attempted via any one or more of several different routes, for example:

(a) the velocity of the inlet gas stream may be reduced and strong atomization may be effected at a high rate of flow and under great pressure. This is conveniently accomplished in absorption columns; compare, e.g., those described in U.S. Pat. No. 2,409,088 and in Chapter 20 of *Perry's Chemical Engineering Handbook;*

(b) or the velocity of the inlet gas stream may be increased, and lesser atomization may be effected, resulting in enhanced phase contacting, such as is attained in devices of venturi type, one of which is described, for example, in Belgian Pat. No. 498,107. See also the contacting apparatus disclosed in U.S. Pat. No. 3,733,789.

In each of the aforementioned alternatives, the area of actual contacting of the respective phases, or "contact surface", must be increased in order to enhance efficiency, i.e., the transfer of heat and/or mass transfer must be improved.

And to increase the contact surfaces necessarily requires the expenditure or utilization of extra energy: either on the liquid side via strong atomization, which is effected in a tower; or on the gas side via atomization in a venturi, wherein a significant loss in pressure has to be tolerated. The size of the blower, moreover, must then be increased as a function of the drop in pressure; furthermore, if the gas flow is large, blowers with larger dimensions are required, and still further, their design is complicated by the need to use special materials when treating corrosive gases, which mandates custom equipment.

SUMMARY OF THE INVENTION

Accordingly, a major object of the present invention is the provision of an improved gas-liquid scrubbing technique, and phase contactor therefor, requiring but little capital investment vis-a-vis that of a tower, while at the same time being far more energy efficient than the venturi type of gas-liquid contacting apparatus.

Briefly, the present invention features a novel gas-liquid contactor of cocurrent spray scrubber type, and wherein the velocity and turbulence of the inlet gas to be purified is controlled, and the efficiency of the contacting of the gas with the scrubbing liquid is assured, via provision in the treatment column of a certain apertured diaphragm which defines the contact zone inlet. Thus, energy transfer to the scrubbing liquid is effected by means of atomization, and effective and efficient treatment/purification, e.g., the elimination of objectionable dust particles and environmental contaminants, is easily carried out without the need for specially designed blowers and the like.

BRIEF DESCRIPTION OF THE DRAWINGS

FIG. 1 is a schematic/diagrammatic representation of one embodiment of gas-liquid phase contactor/separator according to the invention;

FIG. 2 is a cross-section of a preferred diaphragm member according to the invention, shown in place in the phase contactor of FIG. 1;

FIG. 3 is a cross-section view of the arrangement of the atomizing or spraying means according to the invention, within the spray column of FIG. 1;

DETAILED DESCRIPTION OF THE INVENTION

Figure 4:
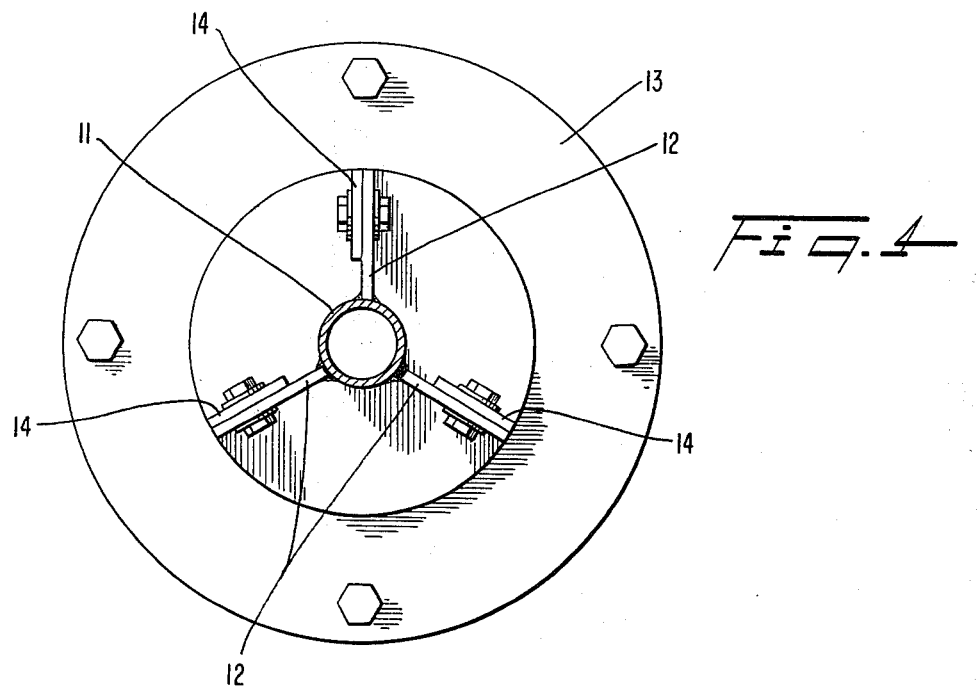
FIG. 4 is a top view within the spray column of the atomizing or spraying means illustrated in FIG. 3.

More particularly according to this invention, the convenient physical and/or chemical treatment of any given gas stream is or are readily effected by the improved contacting thereof with a cocurrently and uniquely directed spray of atomized treatment liquid. Even more particularly according to the invention, the inlet gas feed to be treated consistent herewith is introduced to a first or contact zone of suitable treatment column, and wherein the velocity and turbulence of such gas feed, together with the pressure or force of atomization of the treatment liquid, combine to enhance the gas/liquid contacting, i.e., both an improved interphase surface and effective contact times directly result such that the gas is efficiently physically treated with the liquid, either with or without concomitant chemical reaction. In a second zone, or zone of separation, the dispersed liquid phase, having already exerted its physical and/or chemical effect on the impure gas stream, is then separated therefrom and the treated gas stream is next recovered at essentially the original inlet velocity thereof, and with a minimum amount of treatment liquid content, with such liquid itself being recovered in its virtual entirety.

Typically, the gas stream to be treated/purified has a moderate inlet velocity, i.e., on the order of 15–30 m/s, albeit this range need not be strictly observed, consistent with the invention. In those events where the velocity of the gas stream is too low to insure good interphase surface contact, the velocity and the turbulence of the flow of gas in the contact zone is increased by means of a certain constriction situated at the inlet end thereof.

In the contact zone of the scrubbing column, advantageously an essentially vertical section, the direction of the gas stream to be treated is cocurrent to the direction of atomization of the treatment liquid, i.e., essentially downwardly vertically from the top to bottom.

The separation of the liquid from the gas is thence conducted by abruptly changing the direction of flow of the gas stream, from essentially vertical to essentially horizontal, while the liquid in atomized state continues in its downwardly vertical direction by virtue of the energy of atomization thereof and the force of gravity thereon, and same is then collected in the liquid collection zone or base section of the apparatus.

The mass and/or heat transfer, together with the separation of the respective phases, are sufficiently efficient, such that the now horizontally travelling gas stream already treated consistent with the invention may be directly conveyed into one or more supplemental installations without same having to be of special design or construction. The flow of gas may thus be diverted into a blower of conventional design, downstream of which the gases and, separately, a minimum amount of the treatment liquid are collected. The stream of treated gaseous flow is preferably passed directly into the blower.

If necessary, effluent gas may be further treated by introducing same into a second gas-liquid contacting apparatus, the efficiency of the overall combination being greater than that of the second apparatus alone.

In one embodiment of the invention, an essentially vertical section of a gas conduit is utilized, and wherein the gas downwardly circulates from the top to the base of the apparatus. Such conduit section advantageously has an essentially vertical axis, or it may be slightly inclined with respect to the vertical axis. This portion or segment of the conduit may be of any configuration, for example, cylindrical or square in cross-section, or it may be of a circular cross-section which is not uniform along its generatrix, as will be seen from the examples which follow. A vertically downwardly directed atomizing device or nozzle is disposed in the contact zone having any particular geometry, with a solid-cone nozzle being preferred. It is a preferred embodiment of the invention to utilize a zone of atomization defining an outlet angle thereof on the order of 15° to 30°, e.g., a 15° to 30° downwardly directed spray.

The contact zone inlet is defined by the aperture in a disc or diaphragm integral with the walls of the column, and which is typically perpendicular to the flow of the gas stream.

The position and the dimensions of the contact zone within the treatment column are thus determined by means of the position or location of the diaphragm with respect to the spray nozzle or jet atomizer.

The dimensions of the contact zone depend on the liquid atomized, the pressure and flow rate thereof the pressure of atomization being in the range of 1 to 4 bars; the velocity of the gas, the various materials contained in same, and the physical properties thereof: the temperature, humidity, apparent density, viscosity, etc.

The zone of separation is conveniently established simply by means of an elbow at the base of the column, and, concomitantly, along the path of the gas flow; it is of advantage to locate such elbow at a right angle to the column/gas flow. The gases are conveyed to and through the elbow and thence are evacuated from the apparatus, in a purified state depending, e.g., on the nature of the inlet gas itself and the temperature of the scrubbing or wash liquid. The wash liquid is collected or recovered essentially completely in its entirety at the base of the vertical column, in a liquid collection zone.

Referring specifically to the representative gas-liquid phase contactor depicted in FIG. 1 of the drawings, a vertical treatment column 1 is illustrated, and wherein the inlet gas 3 to be "scrubbed" is introduced therein through a conduit or elbow 2, for example, one affixed to and communicating with the interior of the column at a 90° angle thereto, as shown. The inlet gas stream 3 circulates downwardly around a solid-cone nozzle or atomizer 4 which sprays at an angle of, e.g., 15°–30°. The spray nozzle 4 is secured within the column at a height which can conveniently be varied, or is adjustable, for those purposes as will later be seen.

An apertured diaphragm 5, the orifice of which defines the contact zone 7 inlet, is fixedly secured to the internal walls of the column 1, peripherally integral therewith, and is perpendicular thereto and to the gas flow. To facilitate manufacture or assembly of the column 1, the diaphragm 5 is part of a flexible sleeve member 6 which joins the contact zone 7 of the apparatus to the upstream end thereof. Such design is of further advantage in serving to eliminate the problems of vibrations and expansions/contractions inherent in gas-liquid contacting apparatus.

In another embodiment of the invention, as shown in FIG. 2, a diaphragm 5' is illustrated, with the center thereof being downwardly declined in the direction of the flow of the gas, this particular configuration being selected for purposes of strength of materials considerations.

Of course, any other equivalent configurations may be adopted without departing from the scope of this invention.

In each case, however, the orifice or aperture of the diaphragm is most preferably circular. And as will also be seen from FIG. 1, after the gas stream has been scrubbed in the contact zone 7, same abruptly changes direction and passes into the separation zone 8, wherefrom said now-treated gas stream is discharged from the apparatus 1. The liquid from the spray, nonetheless, continues in its downward direction, by gravity, and is collected at 9, and discharged via the line 10. The separation zone 8, advantageously a simple conduit or elbow perpendicularly extending from the column 1, also serves to direct the effluent gas stream, for example, to suitable blower (not shown) therefor.

It has been determined to be of advantage to utilize a length of pipe as short as possible for the atomized liquid, which serves to eliminate vibrations due to the flow of the liquid and the gas, thus contributing to one overall useful life of the materials comprising the apparatus.

The diaphragm is disposed in a horizontal plane proximate the apex of the solid-cone atomizer, or spray nozzle. The aperture of said diaphragm is thus adapted to define a constricted inlet into the contact zone and, by reason thereof, the velocity and turbulence of the inlet gas stream are increased, both of which contributing to an enhanced interphase surface and effective interphase contact times. Most preferably, the spray from the atomizer, and the distance of the diaphragm downstream therefrom, are such that the expanse of the spray, at the point of intersecting the plane of the diaphragm, is approximately equal to the diameter of the preferably circular aperture or orifice in said diaphragm, and is coaxial therewith.

The precise height of the spray head within the treatment column is controlled by any suitable device, advantageously the means illustrated in detail in FIGS. 3 and 4.

In FIGS. 3 and 4, a coaxial pipe 11 terminating in suitable spray nozzle is shown, the same being secured within the column by three straps 12, with the means 13 being a solid flange having three additional rigid fastening straps 14 upwardly depending therefrom. The straps 12 contain slot openings 12a, whereby the pipe 11 may be adjustably fitted and secured in any desired position or at any desired height, simply by means of suitable nut-and-bolt, for example.

The process and the apparatus of the invention are utilized to advantage over the broad spectrum of gas-liquid contacting, whenever the gases to be treated are moving at moderate velocities.

Moreover, the apparatus is not only simple in its design, but also in the utilization thereof; the expenditure of energy is quite low with respect to the efficiency thereof; and the outlet or effluent gas is well adopted for further processing via blowers of conventional type.

The physical and chemical treatment of a flow of gas according to the invention are especially suited for absorption operations; for the condensation and the cooling of hot gases (particularly, in the event that the hot gases are to be purged from a calciner, i.e., same may conveniently be cooled in the apparatus of the invention, such that the volume of the gas to be purged is appreciably reduced).

Too, the size of any blower utilized and the amount of energy consumed are considerably reduced, and useful hot water is produced when water is the scrubbing liquid.

Another advantage of the invention resides in the treatment of the gases entrained by the cooling air of a wet process phosphoric acid production vat; more particularly, the evolution of fluorine is markedly reduced and a hot solution is obtained that may be utilized to advantage for another operation that is being conducted in the same installation.

In order to further illustrate the present invention and the advantages therefor, the following specific example is given, it being understood that same is intended only as illustrative and in nowise limitative.

EXAMPLE

Figure 5:
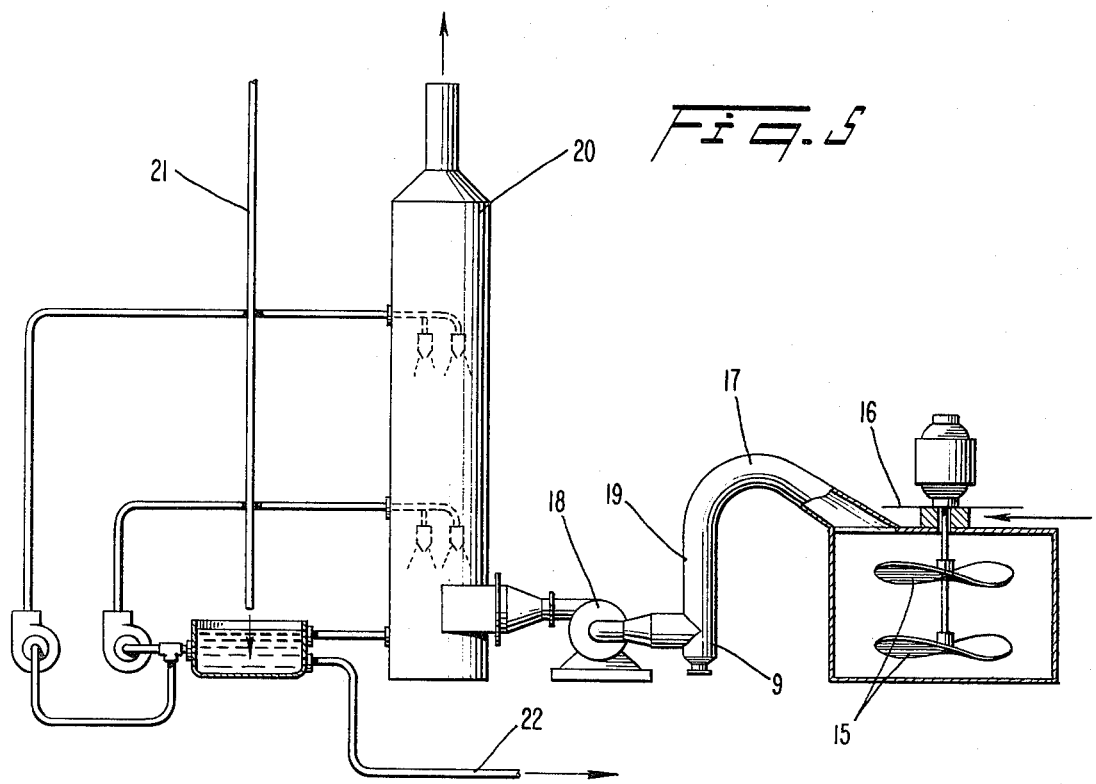
FIG. 5 is a schematic/diagrammatic representation of a facility for the production of wet process phosphoric acid incorporating the gas-liquid phase contactor according to the invention.

To a facility for the production of wet process phosphoric acid, with only the digestion apparatus component thereof being schematically illustrated in FIG. 5, the same comprising a digestion vat 15, a lid 16 therefor and air cooling duct 17, there was operably connected a pollution control device comprising a blower 18 which is situated downstream of a vertical duct 19; said pollution control device also comprises a wash column 20 adapted for two washing stages, means for recirculation of the wash liquid which is introduced through line 21, and means for recycling the scrubbing liquid through the line 22 to another section or component of the overall facility. The gases evolving from the digestion vat, at a rate of approximately 170,000 m³/h, were at a temperature of 65° C. After the aforedescribed treatment, the evolved and thus treated gases still contain impurities which translate to 150 to 200 kg per day of fluorine.

Contrariwise, with the vertical duct 19, which here was square in cross-section, having a phase contactor according to the invention incorporated therein, but not shown, and consisting of a horizontal planar diaphragm similar to that shown in FIG. 1, as element 5, and a solid-cone nozzle supplying 150 m³/h of water at 30° C. at pressure of 3 bars and an angle of 30°, the wash water was collected at 60° C. from the base thereof by means of a discharge outlet located at 9, also not shown, and the effluent gas stream at the outlet of the column 20 was at a temperature of 40°-45° C., and contained only 40 kg/day of fluorine.

While the invention has been described in terms of various preferred embodiments, the skilled artisan will appreciate that various modifications, substitutions, omissions, and changes may be made without departing from the spirit thereof. Accordingly, it is intended that the scope of the present invention be limited solely by the scope of the following claims.

What is claimed is:

1. A method for the treatment of an impure gas stream, which comprises dispersing a cocurrently descending spray of atomized treatment liquid at an angle of 15° to 30° in a vertically descending stream of impure gas feed, introducing the resultant dispersed liquid interphase into a contact zone under such pressure of atomization of said liquid and under such liquid dispersing velocity and turbulence of said gas feed as to ensure effective interphase surface and contact time therefor, whereby the impure gas feed is efficiently scrubbed by said liquid, and thence directing the dispersed liquid interphase to a downstream separation zone and there subjecting the scrubbed gas stream to an abrupt 90° change in direction from vertical to horizontal and separating same from the interphase at essentially the original inlet velocity thereof and with essentially no content of treatment liquid therein, while at the same time maintaining the vertical descent of essentially all of the atomized treatment liquid to a liquid collection and recovery zone.

2. The method as defined in claim 1, further including the step of providing a diaphragm at the inlet to said contact zone to increase the velocity and turbulence of the feed gas therethrough to at least 15 m/sec.

3. The method as defined by claim 2, said contact zone inlet diaphragm being essentially circular.

4. The method as defined by claim 1, wherein the scrubbing of the impure gas feed includes a chemical reacton with the spray of treatment liquid.

5. The method as defined by claim 1, the gas feed being at a velocity of 15 to 30 meters/second.

6. The method as defined by claim 5, the treatment liquid being atomized through a solid-cone nozzle.

7. The method as defined by claim 1, further comprising recovering said treatment liquid from said separation zone.

8. The method as defined by claim 1, further comprising the step of directly passing the separated, scrubbed gas stream through a blower means.

9. The method as defined by claim 1, the treatment liquid comprising water.

10. The method as defined by claim 1, the impure gas feed comprising the vapors of digestion evolved during the wet process production of phosphoric acid, wherein the major portion of the fluorine compounds and of the heat content are captured in the form of a hot aqueous solution that may be utilized in another part of the processing installation.

11. The method as defined by claim 1, further comprising the step of repeating said method downstream of the point at which the gas stream undergoes the abrupt change in direction.

12. The method as defined by claim 1, the same including absorption of the impure gas stream by the treatment liquid.

13. The method as defined by claim 1, the same including cooling of the impure gas stream by the treatment liquid.

14. The method as defined by claim 1, the same including condensation of the impure gas stream by the treatment liquid.

15. A gas-liquid phase contactor/separator, comprising an essentially vertical treatment column having gas feed inlet means and having means for directing the gas feed in a vertically descending direction; said contactor/separator further including means for establishing a cocurrently descending spray of atomized treatment liquid in said column and for dispersing same in the descending stream of gas feed, said column also having a downstream contact zone, said contact zone including an apertured diaphragm at the inlet thereto and being positioned and arranged to ensure effective interphase surface and contact time therefor; an interphase separation zone positioned downstream from the contact zone outlet, said separation zone comprising means for abruptly changing the direction of flow of the then treated gas stream 90° from vertical to horizontal and for separating the same from the interphase at essentially the original inlet velocity thereof and with essentially no content of treatment liquid therein, a liquid collection and recovery zone positioned in the lower portion of said column such that the descent of essentially all of the atomized treatment liquid to said liquid collection and recovery zone is maintained.

16. The phase contactor/separator as defined by claim 15, the means for abruptly changing the direction of flow of the treated gas stream comprising a conduit essentially perpendicular to the longitudinal axis of said column at said contact zone, and being in communicating relationship therewith.

17. The phase contactor/separator as defined by claim 16, said means for establishing a cocurrently descending spray of atomized treatment liquid comprising a solid-cone nozzle.

18. The phase contactor/separator as defined by claim 16, said means for establishing the cocurrently descending spray of atomized treatment liquid being vertically adjustable in height.

19. The phase contactor/separator as defined by claim 16, further including effluent gas stream blower means positioned in said perpendicular conduit.

20. The phase contactor/separator as defined by claim 15, wherein said column comprises a flexible sleeve member and said apertured diaphragm is mounted on said flexible sleeve member.

21. The phase contactor/separator as defined by claim 15, said apertured diaphragm being downwardly declined.

22. The phase contactor/separator as defined by claim 15, the aperture in said diaphragm being essentially circular.

23. The phase contactor/separator as defined by claim 15 connected to an apparatus for the production of wet process phosphoric acid and adapted to receive the vapors of digestion therefrom.

24. The phase contactor/separator as defined by claim 15, said apertured diaphragm being fixedly perpendicularly secured to the internal walls of the treatment column and being peripherally integral therewith.

* * * * *